United States Patent [19]
Buck et al.

[11] Patent Number: 5,195,415
[45] Date of Patent: Mar. 23, 1993

[54] APPARATUS FOR CUTTING ELONGATE PIECES

[75] Inventors: Wayne R. Buck; Todd E. Hoffman, both of Medford, Oreg.

[73] Assignee: Sweed Machinery, Inc., Gold Hill, Oreg.

[21] Appl. No.: 825,563

[22] Filed: Jan. 24, 1992

[51] Int. Cl.⁵ .......................... B26D 5/20; B26D 7/08
[52] U.S. Cl. ........................................ 83/176; 83/162; 83/208; 83/436; 83/601; 83/694
[58] Field of Search ................ 83/208, 261, 436, 601, 83/604, 610, 694, 176, 150, 162, 597, 607

[56] References Cited

U.S. PATENT DOCUMENTS

| | | | |
|---|---|---|---|
| 2,363,630 | 11/1944 | Wales | 83/597 |
| 2,890,749 | 6/1959 | Anderson | 83/604 X |
| 2,961,017 | 11/1960 | Traben | 83/436 X |
| 3,177,749 | 4/1965 | Best et al. | 83/208 |
| 3,279,295 | 10/1966 | Teplitz | 83/601 |
| 3,500,709 | 3/1970 | Landman | 83/610 X |
| 3,760,677 | 9/1973 | Campbell | 83/610 X |
| 4,257,295 | 3/1981 | Patel | 83/208 X |
| 4,633,742 | 1/1987 | Gutowski et al. | 83/208 X |

Primary Examiner—Eugenia Jones
Attorney, Agent, or Firm—Kolisch Hartwell Dickinson McCormack & Heuser

[57] ABSTRACT

A power-driven chopper for cutting up elongate material. The chopper includes a pair of feed rolls, each of which is motor-driven, delivering material to an anvil. A knife on a knife pivot arm is moved in an arc pass the knife to cut material. A motor actuates the knife pivot arm, and the motors for the feed rolls and the knife pivot arm are actuated in timed relation.

2 Claims, 3 Drawing Sheets

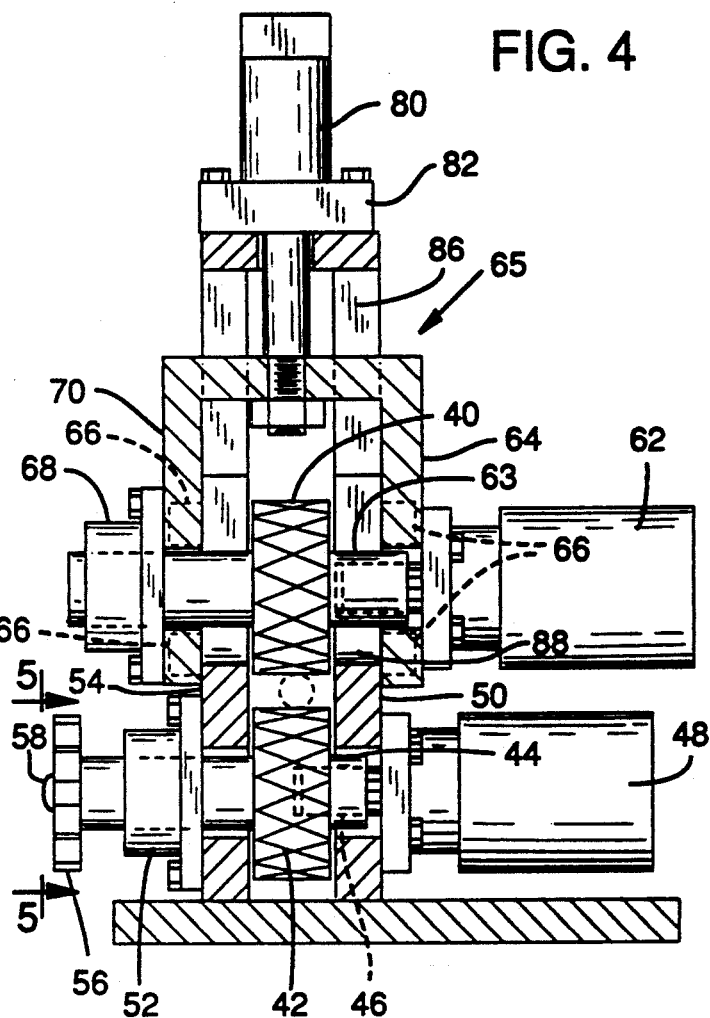
FIG. 4
FIG. 5
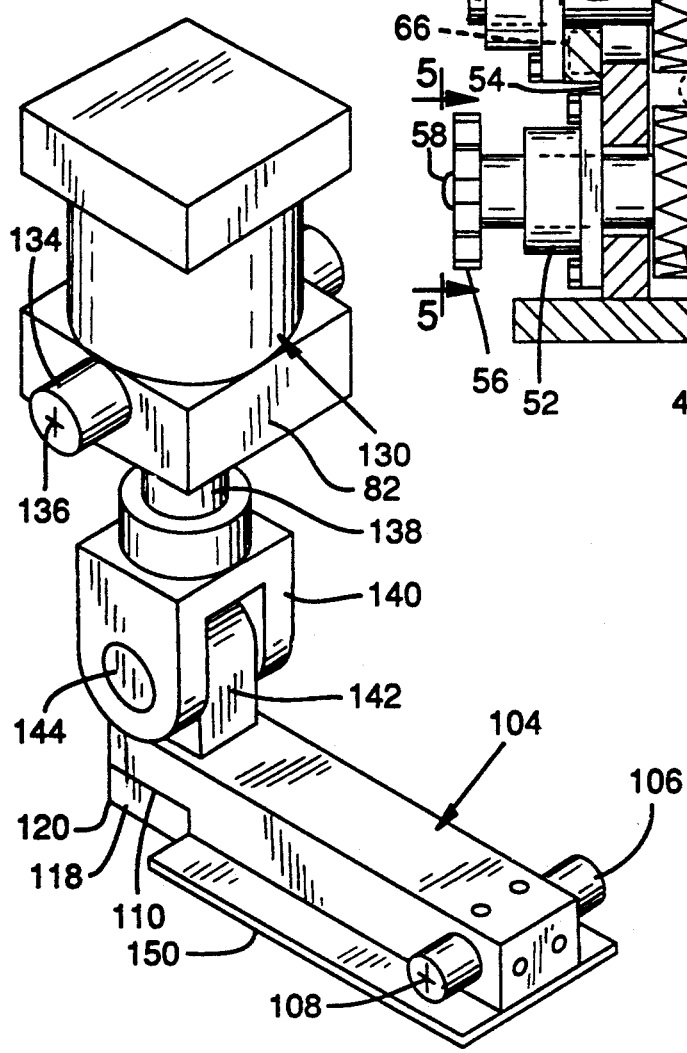
FIG. 6

APPARATUS FOR CUTTING ELONGATE PIECES

BACKGROUND AND SUMMARY OF THE INVENTION

This invention relates to a chopping apparatus or chopper, that may be used to process wire rope, tubing, elongate scrap pieces, and similar material, to cut the material into segments or pieces of predetermined length. With the material cut up or chopped into short pieces of predetermined length, the material is more easily handled for recycling or reprocessing purposes. For instance, the machine might be used to cut up wire rope to produce pieces three to four inches in length. These pieces are easily collected in barrels or other containers for disposal purposes.

A general object of the invention is to provide an improved chopper with a unique cutting knife and anvil construction for producing the chopping of material. Following the invention, a rapid cutting action results with reduced wear on knife and anvil cutting edges.

Another general object is to provide an improved chopper which is adjustable in operation, in that the length of the pieces cut by the chopper may be changed to fit the needs of the particular user.

An object related to the above is the provision of a chopper which features a pair of opposed feed rolls yieldably biased toward each other to accommodate different widths of material. Each of the rolls is rotated intermittently by an intermittently actuated motor. Cutting of material fed forwardly by the feed rolls is performed by an intermittently operated cutter. By changing the length of the time periods during which the drive motors for the rolls operate, the length of material advanced by the rolls is adjusted, and this in turn changes the length of the material cut off by the cutter.

Another object is to provide an improved chopper with a construction for feed rolls in the chopper capable of exerting a pulling force of considerable magnitude on any material fed the machine. This is important in processing wire rope, for instance, where it frequently is necessary to pull a piece of rope out from a tangled mass of other material for processing purposes.

A related object is to provide a chopper which has a pair of opposed feed rolls with rolls being displaceable from each other to accommodate the passage therebetween of different width material but yieldably biased toward each other to exert a firm gripping pressure on the material. While the feed rolls are relatively displaceable, they are nevertheless driven in timed relation by providing a separate drive motor such, as a hydraulic motor, for each roll, with control means coordinating the operation of the motor for one roll with the operation of the motor for the other roll.

An additional feature and object of the invention is to provide a chopper which is relatively maintenance free, and which is easily disassembled whenever repair or replacement of parts is necessary.

In a preferred embodiment of the apparatus described herein, a mobile unit is disclosed, with the chopper, controls, and a source of power being all supported on a mobile frame such as a trailer frame. This enables the equipment to be wheeled to the location desired, and after clean up removed from the site involved.

BRIEF DESCRIPTION OF THE DRAWINGS

These and other objects and advantages are attained by the invention, which is described hereinbelow in conjunction with the accompanying drawings, wherein:

FIG. 4 is a cross-sectional view, taken along the line 404 in FIG. 3;

FIG. 5 is a view of a side position of the apparatus taken along the line 5—5 in FIG. 4;

FIG. 6 is a perspective view illustrating a cutter knife mounting arm in the chopper and a ram or motor used in powering the arm; and FIG. 7 is a block diagram illustrating a control system used.

DETAILED DESCRIPTION OF A PREFERRED EMBODIMENT

Figure 1:
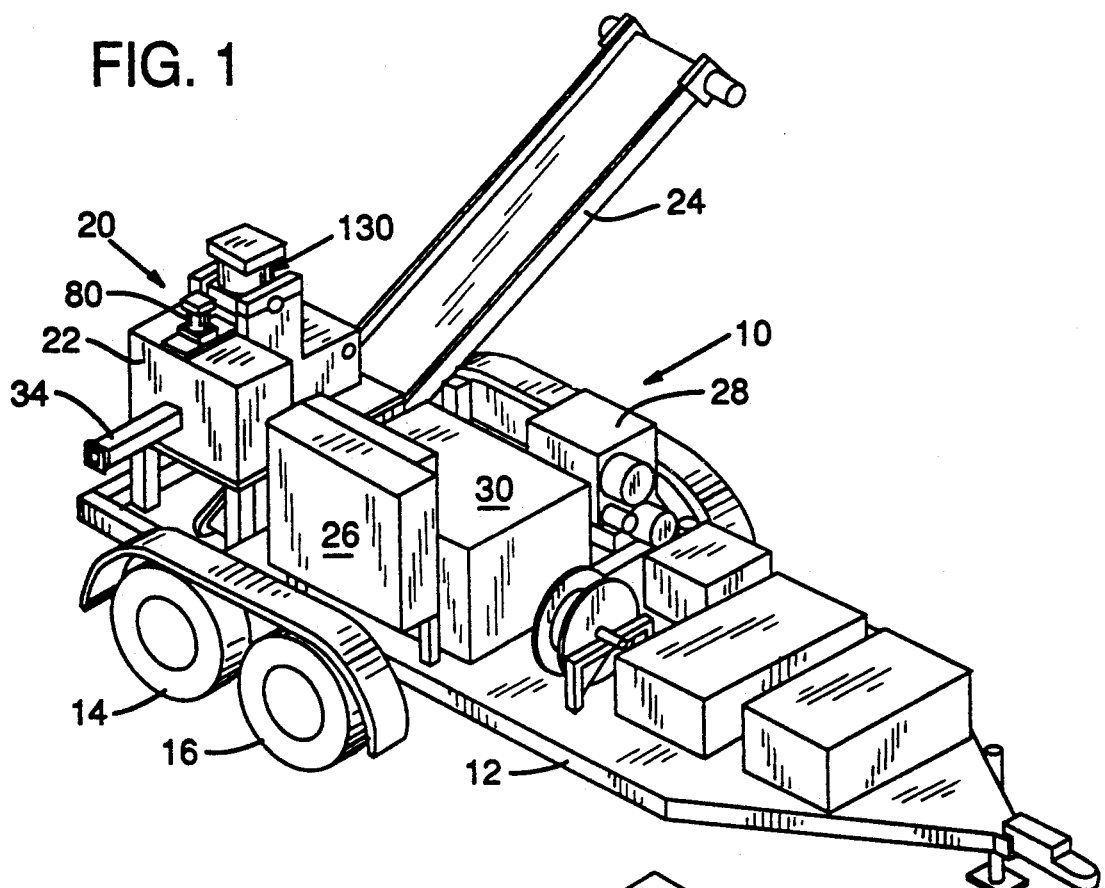
FIG. 1 is a simplified perspective view illustrating the chopper apparatus as part of a mobile unit.
Figure 2:
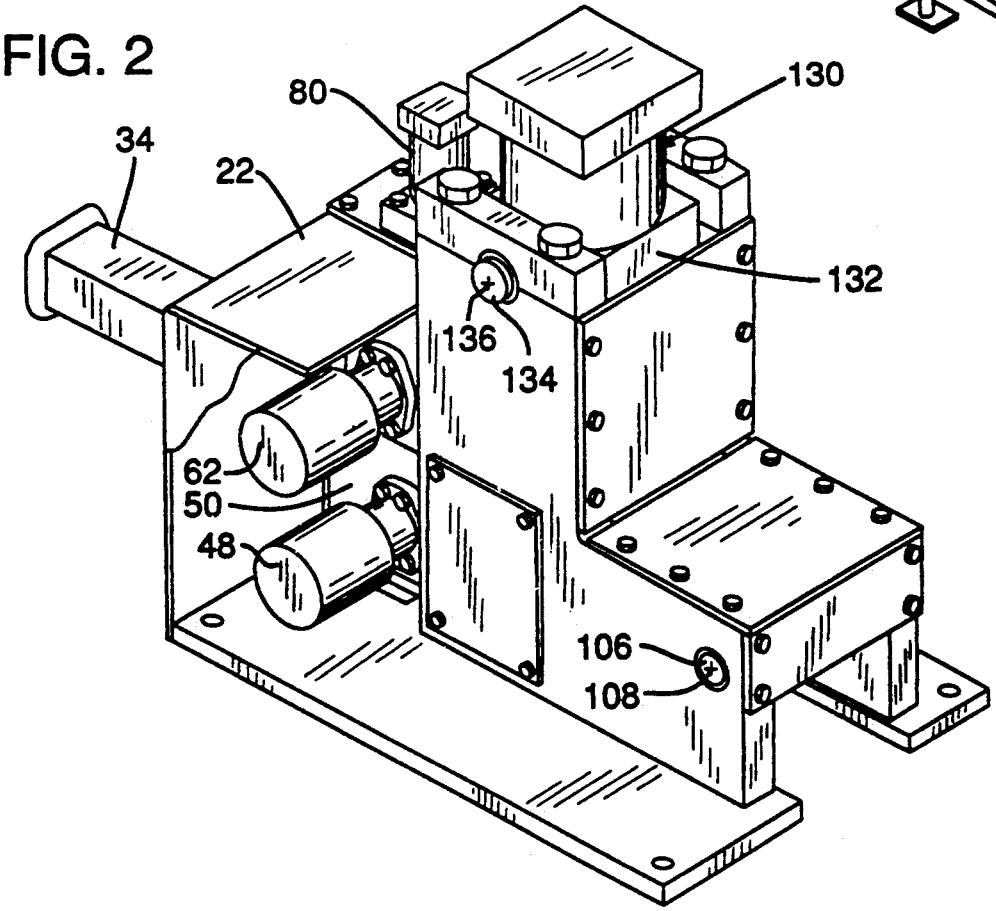
FIG. 2 is a perspective view, on an enlarged scale, illustrating the apparatus.

Referring now to the drawings and referring initially to FIG. 1, a mobile unit including the chopper apparatus is illustrated generally at 10. The unit as illustrated includes a trailer frame 12 supported for movement over the ground by wheels 14, 16. Suitably supported on the trailer frame is the scrap cutter or chopper 20, the principle elements of which are housed within a housing 22. Extending outwardly from the chopper and ordinarily set up at the processing site, is an offbearing or exhaust conveyor 24 which transports cut pieces produced by the apparatus away from the machine. Controls for the unit are housed within a control panel housing 26. Providing power to operate the unit is a diesel engine 28. A source of hydraulic pressure fluid produced with operation of the engine is housed within housing 30.

The chopper includes an infeed guide 34 in the form of an elongate tube secured to and projecting outwardly to one side of housing 22. Material fed the chopper travels along a hollow passage 36 (see FIG. 3) extending within the guide. Material processed, as earlier discussed, typically may comprise an elongate piece of wire rope. With such inserted into guide 34, the wire rope extends along passage 36 to be fed toward a pair of feed rolls shown at 40 and 42.

Feed roll 42 which is the lower feed roll, is non-rotatably secured, through a feed roll shaft 44, to a power-driven shaft 46. To increase traction, the feed roll may have a knurled outer surface. Shaft 46 is the output shaft of a hydraulically powered orbit motor 48 which has its casing secured to a side wall 50 of the housing 22. Shaft 44, on the side of feed roll 42 facing away from motor 48, is journaled in a bearing 52 mounted on side wall 54 which is opposite side wall 50.

As will be further described, motor 48 and other motors in the machine are intermittently operated to intermittently rotate its output shaft and roll 42. Part of the control system controlling the operating periods of this motor is toothed sprocket 56 which is secured to shaft 44 where such protrudes beyond wall 54. The teeth of the sprocket successively move with rotation of the sprocket past a proximity sensor shown at 58. Signals from the proximity sensor are feed to a control system or means. Typically the chopper of the invention may chop pieces or segments from material with desired lengths ranging from two inches to over ten feet. With the proximity sensor being able to determine the position of shaft 4 at the start of operation of the motor and at the conclusion of operation of the motor, and any full revolutions that the shaft has taken in the interval between starting and stopping of the motor, a means is afforded for determining the exact length of material advanced by the roll.

Feed roll 40 may have a similar construction to roll 42. Feed roll shaft 63 of roll 40 is driven by the output shaft of a hydraulically driven orbit motor 62. This oribit motor has its casing mounted on the depending plate 64 of a clevis 65. The plate is guided for vertical movement on the outside of wall 50 through cam followers 66.

The opposite end of shaft 63 is supported in a bearing 68. This bearing is mounted on depending plate 70 of vertically movable clevis 65.

The construction described enables the upper feed roll to be displaced away from and to advance toward the lower feed roll, with the rolls thereby following the contour of material fed.

Yieldably biasing clevis 65 downwardly, and thus feed roll 40 against roll 42, is a hydraulic ram or pinch cylinder indicated at 80. The ram has its cylinder end suitably mounted on a plate 82 secured to the top of housing 22. The rod end of the ram extends downwardly through this plate and is suitably secured to clevis 65.

Clearance is provided for the clevis, enabling up and down travel of the clevis by providing cutouts 86. Accommodating up and down travel of shaft 63 are vertical slots 88.

The system supplying pressure fluid to ram 80 is such as to maintain a predetermined limited pressure of fluid within the ram. The ram yieldably contracts under the influence of an upward force of a certain magnitude exerted on feed roll 40.

Secured to the interior of housing 22 downstream from the feed rolls is an angled piece 90. The upper portion of this angle piece is essentially aligned with the lower wall of guide 34, and this lower wall and piece 90 define a path for the travel of material through the chopper and between the feed rolls.

Cutting of material in the apparatus illustrated is performed by swinging a cutter knife in an arcuate sweep, whereby a cutting edge in the knife moves downwardly towards and then while directly adjacent, past a cutting edge in an anvil. The cutter knife during this cutting pas is braced and held firmly by a pivoted mounting arm which mounts the knife.

Further explaining, illustrated generally at 104 is an elongate mounting arm. The mounting arm is pivotally mounted at one end through a pivot shaft 106 which extends transversely of the path of material through the chopper and which has its ends suitably supported in opposite side walls of the housing 22. The pivot axis for the mounting arm corresponds to the axis of shaft 106 and is designated in the drawings at 108.

The end of mounting arm 104 remote from the end having the pivot shaft is provided with a pocket 110 of rectangular configuration. Detachably mounted within this pocket, by a fastener 116, is a rectangular knife or block element 118. The block element has the dimensions of a square when received in a direction extending along the axis of fastener 116 in FIG. 3, and is bounded by eight cutting edges of equal length. When an individual edge becomes dull as a result of use, such can be replaced by repositioning the block element whereby another of its eight cutting edges becomes positioned in the exposed position possessed by edge 120 as shown in the drawings.

Mounting arm 104 is moved up and down by actuation of a ram or motor, also referred to as a shear cylinder 130. The ram has relatively extensible ends. Its cylinder end is fitted within a collar 132, and collar is pivotally supported by opposed pivot pins 134 for pivotal movement about axis 136. The rod end 138 of the ram is secured to a clevis 140. Legs in the clevis straddle an ear 142 secured to the mounting arm. Interconnecting the ear and clevis is a pivot pin 144.

Figure 3:
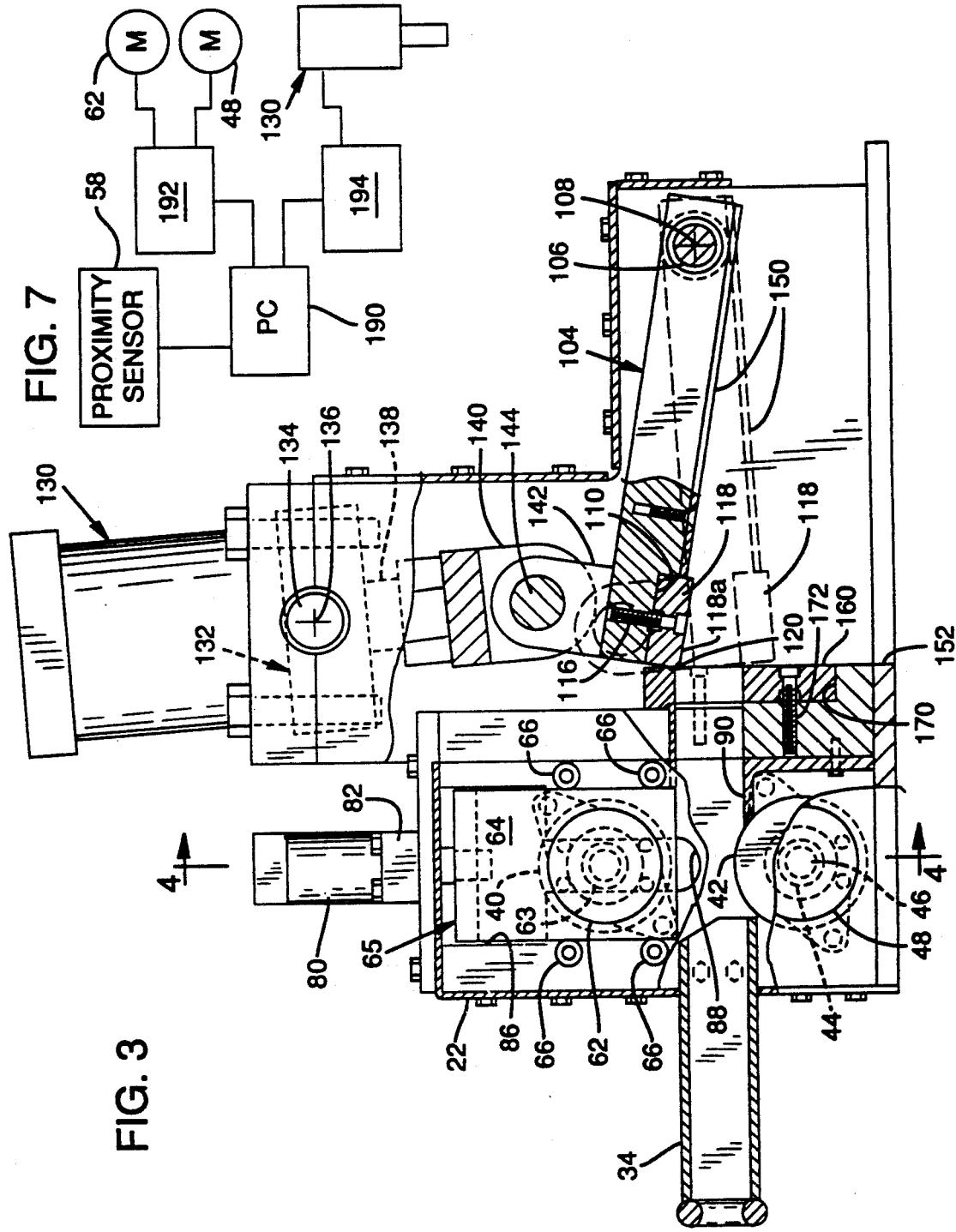
FIG. 3 is a cross-sectional view of the apparatus.

With the construction described, the arm and the cutting block mounted on its end is swingable from the raised position shown in solid outline in FIG. 3 to a lowered position indicated in dashed outline in FIG. 3. With the mounting arm raised and with material fed by the feed rolls along the feed path, the forward end of the material on passing block 118 tends to move against the underside of the mounting arm. Wear plate or exhaust guide 150 detachably fastens to the underside of the mounting arm.

The bottom of the housing has an opening 152. Material chopped during the chopping operation falls downwardly through this opening. Material also is deflected downwardly through this opening by exhaust guide 150.

During cutting, the bottom of the material is supported by an anvil. This anvil may take the form of a cutting block element 160, and this block element may be a duplicate of the element used for the cutting knife. Thus, it also is rectangular in shape, and has eight cutting edges. The block element is detachably mounted in place in a pocket 170 by a fastener 172. With the block element in place, the top of the block element lies at the level of the feed path through the equipment.

In making a cut through material fed into the cutting station of the chopper, the cutting edge of the cutter knife moves in an arc with swinging movement of the mounting arm. The edge along its length generates the arc of a cylinder extending down and directly adjacent the cutting edge of the anvil. In moving from its raised position to its lowered position in a cutting pass, the cutting edge moves from a position downstream of the shear plane of the anvil over the shear plane to a position slightly ahead of the shear plane, and then returns to a position downstream of the shear plane at the completion of the cutting pass.

It should also be noted that the surface of the cutting block element which is in the plane of the cutting edge and extends downstream from the cutting edge with the block element in position, constitutes a pressure-applying surface. More specifically, in FIG. 3 this surface is exemplified by surface 118a of the cutting block element.

During a cutting pass, and assuming material lies along the feed path and over the anvil, before any cutting occurs pressure-applying surface 118a of the knife element contacts the material to compress it downstream of the cutting edge in the anvil. With wire cable, this compressing reduces the diameter of the cable, to reduce the distance the shearing edge must travel to produce a cut. Further, the cable tends to bend by reason of this pressure, with bending occurring about a radius established by the cutting edge of the anvil. This bending applies tension to the various strands of the cable whereby they tend to break apart. The result is that a cable is severed by the cutting edge of the knife element with greater facility than were the cable not subjected to any bending stress. This ease of cutting is reflected in faster cutting of the material processed and less dulling occurring over time in the anvil cutting edge and the cutting edge of the cutter.

Illustrated schematically in FIG. 7 is a control means such as may be used to control operation of the chopper. A programmable controller is shown at 190. Signals produced by proximity sensor 58 as the result of actuation by the teeth of sprocket 56 reflect the amount of rotation that has occurred in the feed roll shaft. These are fed to the programmable controller. Control signals are fed from the programmable controller to controls 192 and 194, which include valves controlling the orbit motors driving the feed rolls, and actuation of shear cylinder. The programmable controller produces a proper delay between the actuating periods for the orbit motors for the feed rolls, and the actuation period of shear cylinder 130. The programmable controller is adjustable to change the length of the operating periods for the feed rolls. The motors rotating the feed rolls ordinarily are rotated in synchronism. The ram or shear cylinder producing cutting is operated in timed relation to the motors rotating the feed rolls, i.e. is actuated to extend and contract and complete a cutting cycle in the cutter at some time after stopping of the motors rotating the feed rolls.

Operation of the chopper should be obvious. Very briefly, the material to be cut has an end fed into infeed guide 34 to be advanced to the nip region existing between the feed rolls 40, 42. The orbit motors for the feed rolls are actuated in unison for a given period of time, to rotate the feed rolls a predetermined amount. This advances the end of the material a predetermined distance forwardly of the feed rolls. The material on moving forwardly travels along the feed path in the machine to advance the forward end of the material beyond the anvil and against exhaust guide 150. With the appropriate amount of material advanced by the feed rolls, feed roll operation is stopped, and the feed rolls at this time then serve to clamp the material in place. After stopping of rotation of the feed rolls, the shear cylinder is actuated through a cycle, to extend and retract, causing the cutting edge of the cutter to move downwardly in a cutting pass and then to return. With such movement, the cable is first compressed and then bent with the pressure-applying surface of the block which contains the cutting edge of the cutter. A segment of the wire rope is severed with the cutting edge. Cut material moves downwardly and falls by gravity through opening 152.

With the unit set up at some clearing site, the material falling through opening 152 falls onto the conveyor 24 to be transported away from the mobile unit.

While a particular embodiment of the invention has been described, it should be obvious that variations and modifications are possible. The coverage of the invention is set forth in the appended claims.

It is claimed and desired to secure by letters patent:

1. A power-driven chopper for cutting elongate material in chunks comprising:
   a frame,
   feed roll means including a pair of opposed rotatable feed rolls mounted on said frame for rotation about horizontal axes and means biasing the rolls toward each other to press against opposite sides of material fed to the feed rolls, feed roll powered means for rotating the feed rolls, the feed rolls advancing material along a feed path extending transversely of the rolls and downstream from the rolls,
   an anvil downstream from the extending transversely of and on the underside of the path of material from the feed rolls for supporting material to be chopped, said anvil having a horizontal anvil cutting edge,
   a knife and a pivot arm mounting the knife, pivot means mounting the pivot arm for pivotal movement about a horizontal axis located along the feed path downstream from the anvil and the axis extending transversely of the feed path, the knife having a knife cutting edge and the knife cutting edge moving in a cutting pass with pivoting of the pivot arm and the cutting edge during a cutting pass moving from a starting position which is above said feed path to a finish position where the knife cutting edge has moved across and below the anvil cutting edge, a guide surface mounted on said pivot arm which extends at an incline across the feed path in a region located downstream from the cutting edge of the anvil with the cutter knife held by the pivot arm in the starting position for the cutter knife, and
   cutter powered means operatively connected to the pivot arm for pivoting the arm under power.

2. The chopper of claim 1, wherein the cutter powered means comprises a fluid-powered ram having opposite relatively extensible ends, first pivot means pivotally mounting one of said ends on said pivot arm, and second pivot means pivotally mounting the other of said ends on the frame.

* * * * *